(12) United States Patent
Chen et al.

(10) Patent No.: US 12,548,559 B1
(45) Date of Patent: Feb. 10, 2026

(54) TRAINING NEURAL NETWORK COMPONENTS

(71) Applicant: Amazon Technologies, Inc., Seattle, WA (US)

(72) Inventors: I-Fan Chen, Sammamish, WA (US); Satya Venkata Phani Sankar Nidadavolu, Redmond, WA (US); Brian King, Bellingham, WA (US); Pegah Ghahremani, Seattle, WA (US); Pin-Jui Ku, Brookhaven, GA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 18/341,159

(22) Filed: Jun. 26, 2023

Related U.S. Application Data

(60) Provisional application No. 63/490,332, filed on Mar. 15, 2023.

(51) Int. Cl.
  *G10L 15/16* (2006.01)
  *G10L 15/06* (2013.01)
  *G10L 15/18* (2013.01)

(52) U.S. Cl.
  CPC ............ *G10L 15/16* (2013.01); *G10L 15/063* (2013.01); *G10L 15/1815* (2013.01)

(58) Field of Classification Search
  CPC .... G10L 15/16; G10L 15/063; G10L 15/1815
  See application file for complete search history.

(56) References Cited

U.S. PATENT DOCUMENTS

| | | | | |
|---|---|---|---|---|
| 11,735,171 | B2 * | 8/2023 | Qian | G10L 15/22 704/243 |
| 12,112,752 | B1 * | 10/2024 | Gupta | G10L 15/08 |
| 12,190,862 | B2 * | 1/2025 | Rosenberg | G10L 15/063 |
| 2021/0350786 | A1 * | 11/2021 | Chen | G10L 13/08 |

(Continued)

OTHER PUBLICATIONS

Jinyu Li, et al. "An Overview of Noise-Robust Automatic Speech Recognition," IEEE/ACM Transactions on Audio, Speech, and Language Processing, vol. 22, No. 4, pp. 745-777, Apr. 2014.

(Continued)

*Primary Examiner* — Michael Colucci
(74) *Attorney, Agent, or Firm* — Pierce Atwood LLP

(57) ABSTRACT

A machine learning model may be configured for training using an associated learning technique. A model configured for end-to-end backpropagation may adapted for associated learning by introducing functions for projecting hidden vectors and labels to a shared representation space and for reconstructing labels from representation vectors. An associated learning loss may be calculated at each layer, with the resulting gradients backpropagated locally through that layer rather than all layers. A reconstruction loss may be calculated using each layer's output including the predicted label. Training by associated learning may be parallelized (e.g., layer by layer) to yield efficiency gains. In addition, associated learning training may be more robust to training label errors. The resulting model may be used to, for example, predict data sequences in an autoregressive manner in which subsequent portions of the output data sequence are predicted in part based on previous predicted portions of the output data sequence.

20 Claims, 11 Drawing Sheets

(56) References Cited

U.S. PATENT DOCUMENTS

| | | | | |
|---|---|---|---|---|
| 2022/0122581 | A1* | 4/2022 | Chen | G06N 3/047 |
| 2022/0189456 | A1* | 6/2022 | Pang | G10L 21/007 |
| 2022/0246132 | A1* | 8/2022 | Zhang | G10L 15/063 |
| 2022/0366898 | A1* | 11/2022 | Qian | G10L 15/22 |
| 2023/0104228 | A1* | 4/2023 | Li | G06N 3/045 |
| | | | | 704/232 |
| 2023/0169281 | A1* | 6/2023 | Zheng | G10L 15/28 |
| | | | | 704/2 |
| 2023/0317059 | A1* | 10/2023 | Rosenberg | G10L 15/197 |
| | | | | 704/232 |
| 2023/0376734 | A1* | 11/2023 | Liu | G06N 3/045 |
| 2024/0062064 | A1* | 2/2024 | Puzovic | G06N 3/045 |
| 2024/0096077 | A1* | 3/2024 | Luo | G06N 3/045 |

OTHER PUBLICATIONS

Shane Settle, et al. "End-to-End Multi-Speaker Speech Recognition." In ICASSP, Apr. 2018, 7 pages. Retrieved on Aug. 1, 2023 from https://www.merl.com/publications/docs/TR2018-001.pdf.

Tobias Menne, et al. "Analysis of Deep Clustering as Preprocessing for Automatic Speech Recognition of Sparsely Overlapping Speech." In Proceedings of Interspeech (2019), 5 pages, https://arxiv.org/abs/1905.03500v2, Sep. 25, 2019.

I-Fan Chen, et al. "Investigation of Training Label Error Impact on RNN-T," (Dec. 2021), 8 pages, https://arxiv.org/abs/2112.00350v1.

Kartik Audhkhasi, et al. "Mixture Model Attention: Flexible Streaming and Non-Streaming Automatic Speech Recognition." In Proceedings of Interspeech (2021), pp. 1812-1816.

Aleksei Kalinov, et al. "Carnelinet: Neural Mixture Model for Automatic Speech Recognition," (Jul. 2021), 8 pages, https://arxiv.org/abs/2107.10708v1.

Katrin Tomanek, et al. "Residual Adapters for Parameter-Efficient ASR Adaptation to Atypical and Accented Speech," In Proceedings of the 2021 Conference on Empirical Methods in Natural Language Processing, (2021), pp. 6751-6760.

Heng-Jui Chang, et al. "Towards Lifelong Learning of End-to-end ASR," In Proceedings of Interspeech (2021), pp. 2552-2555.

Dennis YH Wu, et al. "Associated Learning: A Methodology to Decompose End-To-End Backpropagation on CNN, RNN, and Transformer," Published as a Conference Paper at ICLR 2022, (2022), 18 pages. Retrieved from https://openreview.net/pdf?id=4N-17dske79.

Yu-Wei Kao and Hung-Hsuan Chen, "Associated Learning: Decomposing End-to-end Backpropagation based on Auto-encoders and Target Propagation," (2021), 34 pages, https://arxiv.org/abs/1906.05560v4.

David Rumelhart, et al. "Learning representations by back-propagating errors." Nature, vol. 323, pp. 533-536 (Oct. 1986). https://doi.org/10.1038/323533a0.

Yu-An Chung, et al. "Vector-Quantized Autoregressive Predictive Coding," In Proceedings of Interspeech (2020), pp. 3760-3764.

Wei-Ning Hsu, et al. "Hubert: How Much Can a Bad Teacher Benefit ASR Pre-Training?," ICASSP 2021—2021 IEEE International Conference on Acoustics, Speech and Signal Processing (ICASSP), (2021), pp. 6533-6537, doi: 10.1109/ICASSP39728.2021.9414460.

William Chan, et al. "Listen, Attend and Spell: A Neural Network for Large Vocabulary Conversational Speech Recognition," 2016 IEEE International Conference on Acoustics, Speech and Signal Processing (ICASSP), 2016, pp. 4960-4964, doi: 10.1109/ICASSP.2016.7472621.

* cited by examiner

Associated Learning Model 200

End-to-End Backpropagation Model 100

TRAINING NEURAL NETWORK COMPONENTS

CROSS-REFERENCE TO RELATED APPLICATION

This application claims the benefit of priority under 35 U.S.C. § 119(c) of U.S. Provisional Patent Application No. 63/490,332, filed Mar. 15, 2023, and entitled "ASSOCIATED LEARNING FOR AUTOREGRESSIVE MODEL ARCHITECTURES", the entire contents of which is incorporated herein by reference for all purposes.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 2:
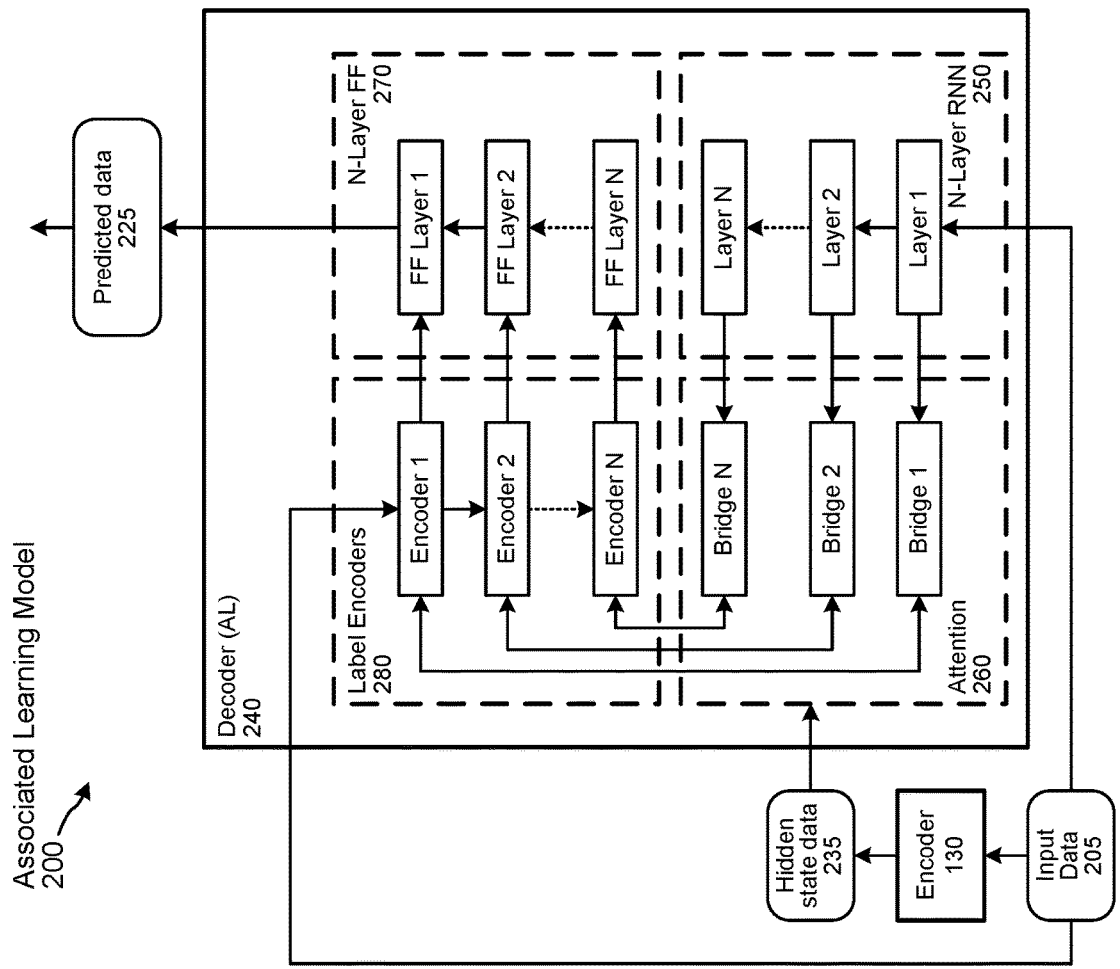
FIG. 2 is a conceptual diagram illustrating a machine learning model with an end-to-end backpropagation architecture modified for associated learning, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Neural machine translation (NMT) is a field of computer science, artificial intelligence, and linguistics concerned with translating natural language from one language to another. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NMT, NLG, and/or TTS may be used together as part of a speech-processing/virtual assistant system that can communicate with a user by processing spoken inputs and responding with synthesized speech. A speech-processing system may additionally receive other inputs and provide other outputs.

Speech processing and generation may be performed using machine learning computer models such as neural networks. Machine learning models may be trained using a technique called backpropagation. Backpropagation includes calculating a loss function between predicted labels and target labels to determine gradients, which are then used to update parameters of the network. Backpropagation may be performed in an end-to-end fashion in which a model processes an input, the output is compared to the target label, and the gradients are backpropagated through the entire model.

Associated learning may decompose end-to-end backpropagation training into multiple optimization targets. For example, gradients may be calculated at the outputs of multiple layers within the machine learning model and used to update parameters for that layer. Thus, associated learning can involve applying a loss function (e.g., an associated learning loss) using representation vectors output by one or more internal neural network layers of the model. The resulting gradients are then used to update the parameters of that layer.

Some machine learning models may predict a sequence of output data in an autoregressive manner in which a first portion of the sequence is used to predict a second, subsequent portion of the sequence. Extending the use of associated learning to autoregressive models may yield benefits similar to those experienced when applying associated learning to classification tasks. Offered herein are, among other things, techniques for applying associated learning to autoregressive models such as those used for ASR, NMT, acoustic event detection (AED), sequence-to-sequence processing, and the like. A listen, attend, and spell (LAS) model architecture is used as an example for developing a functional associated learning form where the input-output alignments are introduced via cross-attention between an encoder and a decoder; however, the techniques discussed herein may be applied to other autoregressive model architectures such as WaveNet, PixelCNN, and transformer-based architectures such as bidirectional encoder representations from transformers (BERT), convolution-augmented transformer (Conformer), generative pre-trained transformers (GPT) like ChatGPT, etc.

A model configured for end-to-end backpropagation may be adapted for associated learning by introducing functions for projecting hidden vectors and labels to the representation space and for reconstructing labels from representation vectors. An associated learning loss may be calculated using the output of these functions at each layer, with the resulting gradients backpropagated locally through that layer. A local reconstruction loss may also be calculated by comparing a label representation determined by one layer with a predicted label representation determined by the next layer. A reconstruction loss may also be calculated by comparing a label of a training dataset with the corresponding predicted label.

In some implementations, the model may be further modified to introduce a stochastic term (e.g., a random, pseudo-random, noise term, etc.) to the label representations. The associated learning loss function used to train the model may be modified based on a Kullback-Leibler divergence (KLD) loss. Introducing the stochastic term and KLD loss function may prevent annihilation of the hidden representations that may occur when training causes the hidden representations to shrink to zero. Use of the noise term and KLD loss function may help the model learn a proper association between representation vectors.

Training a model using associated learning offers several benefits over end-to-end backpropagation. Because gradients are calculated and backpropagated through layers individually, efficiency gains may be achieved by training the layers potentially in parallel. Associated learning may also improve robustness to training label errors and lead to faster training-converge time. In addition, models trained using associated learning as described herein may be deployed with varying levels of complexity depending on computing resources available on the system or system component(s) (e.g., user device(s)) that will implement the model. For example, a complex, multi-layer model may be trained using associated learning. A smaller model including fewer than all of the trained layers may still yield sufficiently high accuracy. Thus, relatively lightweight models may be deployed to devices with relatively limited computing resources without having to train multiple versions of the same model. In some cases, accuracy of a model trained using associated learning as described herein may match the accuracy of models trained using end-to-end backpropagation.

Systems that implement the technique discussed herein may be configured to incorporate user permissions and may only perform activities disclosed herein (e.g., speech processing) if approved by a user. As such, the systems, devices, components, and techniques described herein may be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1:
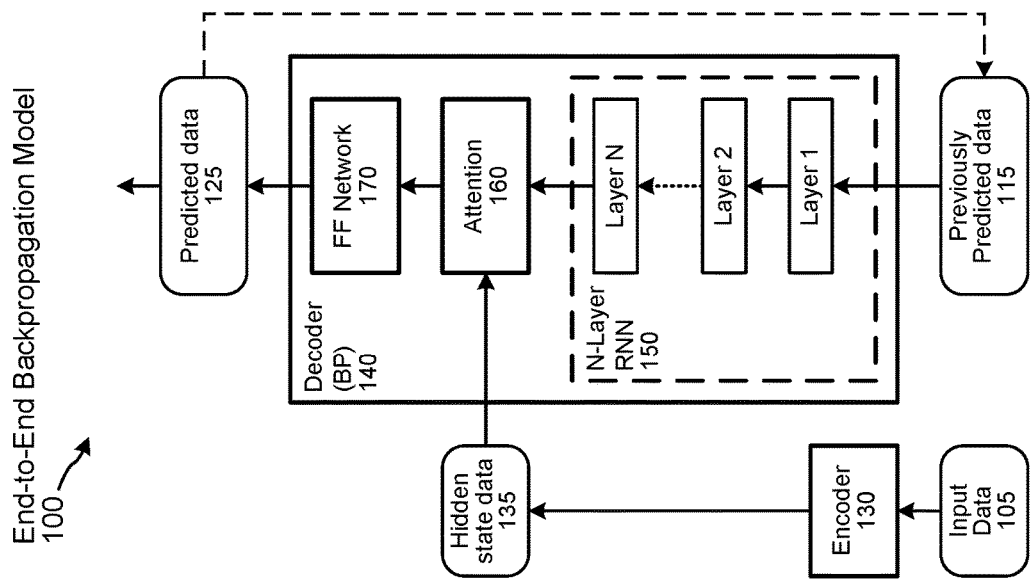
FIG. 1 is a conceptual diagram illustrating an example machine learning model having an end-to-end backpropagation architecture.

FIG. 1 is a conceptual diagram illustrating an example machine learning model 100 having an end-to-end backpropagation architecture. The model 100 may be, for example, a listen, attend, and spell (LAS) model used for transcribing speech. The LAS model is used as an example to illustrate an example of how to reconfigure a model for associated learning, but the techniques described herein apply to other autoregressive model architectures as well. The model 100 includes various neural network components such as an encoder 130 and a decoder 140. The encoder 130 may be a pyramidal recurrent network encoder that accepts input data 105 (e.g., audio data in the form of filter bank spectra or the like) and outputs a high-level representation referred to as hidden state data 135. The hidden state data 135 may be in the form of, for example, a vector in a representational space. In some implementations, the encoder 130 may include N layers of bidirectional gated recurrent unit (GRU) layers. While the word "layers" is used throughout, a "layer" for purposes of the disclosure may refer to a single neural network layer, multiple neural network layers configured as a block (e.g., transformer layers), multiple blocks, and/or units and/or cells of various neural network architectures including, for example and without limitations, LSTMS, BLSTMS, GRUs, transformers, conformers, etc. In some implementations, the encoder 130 may include a recurrent neural network (RNN) such as a Bidirectional Long Short-Term Memory RNN (BLSTM). Configuring the BLSTM in a pyramid structure may reduce the length of the hidden state data 135 relative to the input data 105, which may thousands or millions of audio frames long.

The decoder 140 may be an attention-based RNN decoder that outputs predicted data 125 (e.g., sequences of characters). The decoder 140 may be an autoregressive model in which a portion of the predicted data 125 is based at least in part on previously predicted data 115 as well as the hidden state data 135. The decoder 140 may include an N-layer RNN 150 having layers 1 through N, a cross-attention module 160, and a feedforward (FF) network 170. In some implementations, the N-layer RNN 150 may include N neural network layers. In the example model 100 shown in FIG. 1, a layer of the N-layer RNN 150 may corresponding to a GRU unit whose inputs correspond to previous predicted labels when predicting the next label. The cross-attention module 160 follows the N-layer RNN 150 and receives the hidden state data 135 from the encoder 130. The FF network 170 receives the output of the cross-attention module 160 and generates the predicted data 125 (e.g., in the form of tokens corresponding to characters, etc.).

The encoder 130 and decoder 140 may be jointly trained for end-to-end speech recognition using sequence-to-sequence methods that condition next step prediction on previous predictions. The feed-forward path in the decoder 140 may consist of a sequence of transformations (e.g., $f^1$, $f^2$ ... $f^N$ corresponding to the N GRU layers, respectively), the cross-attention module 160, and the FF network 170. The model 100 may be trained by backpropagating the loss (e.g., a cross-entropy loss) from the output back to each transformation component of the N-layer RNN 150, cross-attention module 160, and FF network 170.

FIG. 2 is a conceptual diagram illustrating a machine learning model 200 modified for associated learning, according to embodiments of the present disclosure. The model 200 may include the same encoder 130 as the model 100 or a different encoder. To create the model 200, the model 100 may be modified by introducing components that implement functions for projecting hidden vectors and labels to the representation space and for reconstructing labels from representation vectors.

The N-layer RNN 250 may include components (e.g., layers) that implement the same transformations as the N-layer RNN 150 of the end-to-end backpropagation model 100 (e.g., $f^1$, $f^2$ ... $f^N$ corresponding to Layer 1, Layer 2 .... Layer N, respectively). The rest of the model 200 may be modified with additional $b^i$, $g^i$, and $h^i$ components, where $b^i$ represents bridge functions implemented by the cross-attention module 260, $h^i$ represents label reconstruction functions implemented by an N-layer FF 270, and $g^i$ represents label encoder functions introduced in new label encoders 280 as described further below. While the word "layers" is used throughout, a "layer" for purposes of the disclosure may refer to a single neural network layer, multiple neural network layers configured as a block (e.g., transformer layers), multiple blocks, and/or units and/or cells of various neural network architectures including, for example and without limitations, LSTMS, BLSTMS, GRUs, transformers, conformers, etc. A "layer" as used herein may also refer to the components implementing an index of the functions $f^i$, $b^i$, $g^i$, and $h^i$ (e.g., $f^1$, $b^1$, $g^1$, and $h^1$ may correspond to a first layer of the model, $f^2$, $b^2$, $g^2$, and $h^2$ may correspond to a second layer, etc.). In the example model 200 shown in FIG. 2, for example, a layer of the N-layer RNN 250 may corresponding to a GRU unit whose inputs correspond to previous predicted labels when predicting the next label.

The cross-attention module 160 may be modified to create the cross-attention module 260 suitable for associated learning. The cross-attention function may be split into N components that implement bridge functions Bridge 1, Bridge 2 .... Bridge N, denoted as $b^i$ (e.g., $b^1$, $b^2$ ... $b^N$). The bridge functions may project hidden vectors (e.g., of hidden state data 135 generated by encoder 130) to the representation space. Each bridge function may correspond to a layer of the N-layer RNN 250. The bridge functions $b^i$ may be implemented as cross-attention modules that take the hidden vector output of $f^i$ as a query and attends to the hidden state data 235.

Label encoders 280 may be introduced to project the labels of the input data 105 to the same representation space; that is, the representation space shared with the output of the bridge functions of the cross-attention module 260. The label encoders 280 may include N encoder components, denoted as g (e.g., $g^1$, $g^2$ ... $g^N$). Similar to the bridge functions, each encoder may correspond to a respective layer of the N-layer RNN 250. The label encoders 280 may be implemented as feedforward networks, stacked together to project the target next token to the $i^{th}$ representation space as a representation vector $\vec{t}_j^i$.

The functions of the FF network 170 may be split to create an N-layer FF 270, where a component (e.g., layer) of the N-layer FF 270 may correspond to a layer of the N-layer RNN 250. An FF layer may implement a decoder function, denoted as h (e.g., $h^1$, $h^2$ ... $h^N$), that reconstructs a label from a vector in the representation space. The label decoder functions h' may reconstruct a label representation vector at the $i^{th}$ layer, $\vec{t}_j^i$, back to the $(i-1)^{th}$ layer, $\vec{t}_j^{i-1}$, and eventually to predicted label $y'_j$ to be output as the predicted data 225.

During training, input data 205 may be fed to the encoder 130, the N-layer RNN 250, and the label encoders 280. The input data 205 may represent a training dataset. For example, in the case of ASR, the input data 205 may include a combination of audio data representing speech and text data representing a transcript of the speech. In such cases, the encoder 130 may process the audio data to generate the hidden state data 235 to which the cross-attention module 260 will attend when generating the predicted data 225. In the case of NMT, the input data 205 may include text data representing a source language (e.g., a natural language such as English, Mandarin, German, etc.) and a text data representing a target language (e.g., a different natural language). In such cases, the encoder 130 may process the source language text/tokens/labels/etc. to generate the hidden state data 235 to which the cross-attention module 260 will attend when generating the predicted data 225. In some implementations, the input data 205 may include a sequence of labels representing text data. In various implementations, the labels may represent tokens such as word tokens, subword tokens, phoneme tokens, character tokens, etc. For example, first portion of the input data 205 may correspond to a first token, a second portion of the input data 205 may correspond to a second token that follows the first token in the sequence, etc.

The encoder 130 may generate hidden state data 235 based on the input data 205. The decoder 240 may attend to the hidden state data 235 when generating the predicted data 225. The predicted data 225 may represent a prediction of what the next portion of the input data 205 will be. Thus, the decoder 240 may begin generating predicted data 225 by receiving a start-of-sequence (e.g., <sos>token) at the N-layer RNN 250. Layer 1 of the N-layer RNN 250 may receive a portion or portions of the input data 205 and generate a first embedding, Layer 2 of the N-layer RNN 250 may receive the first embedding and generate a second embedding, and so on.

A bridge layer of the cross-attention module 260 may receive the embedding from the corresponding layer of the N-layer RNN 250 and, using the hidden state data 135, generate a vector or vectors in the representation space.

A label encoder of the label encoders 280 may also receive a portion or portions of the input data 205 and generate a vector or vectors in the representation space. Similar to the N-layer RNN 250, Encoder 1 of the label encoders 280 may receive a portion or portions of the input data 205 and generate a first representation, Encoder 2 of the N label encoders 280 may receive the first representation and generate a second representation, and so on.

An associated learning loss may be calculated using the output of these functions at each layer, with the resulting gradients backpropagated locally through the layer. For example, a first associated learning loss may be calculated using the output of Bridge 1 and Encoder 1, a second associated learning loss may be calculated using the output of Bridge 2 and Encoder 2, and so on for N associated learning losses.

In addition, a reconstruction loss may also be calculated using each layer output as well as the ultimate predicted label output. The reconstruction loss may be determined based on a comparison of a label representation and a corresponding predicted label representation, or by comparing a label of the input data 205 with a corresponding predicted label of the predicted data 225.

Figure 3:
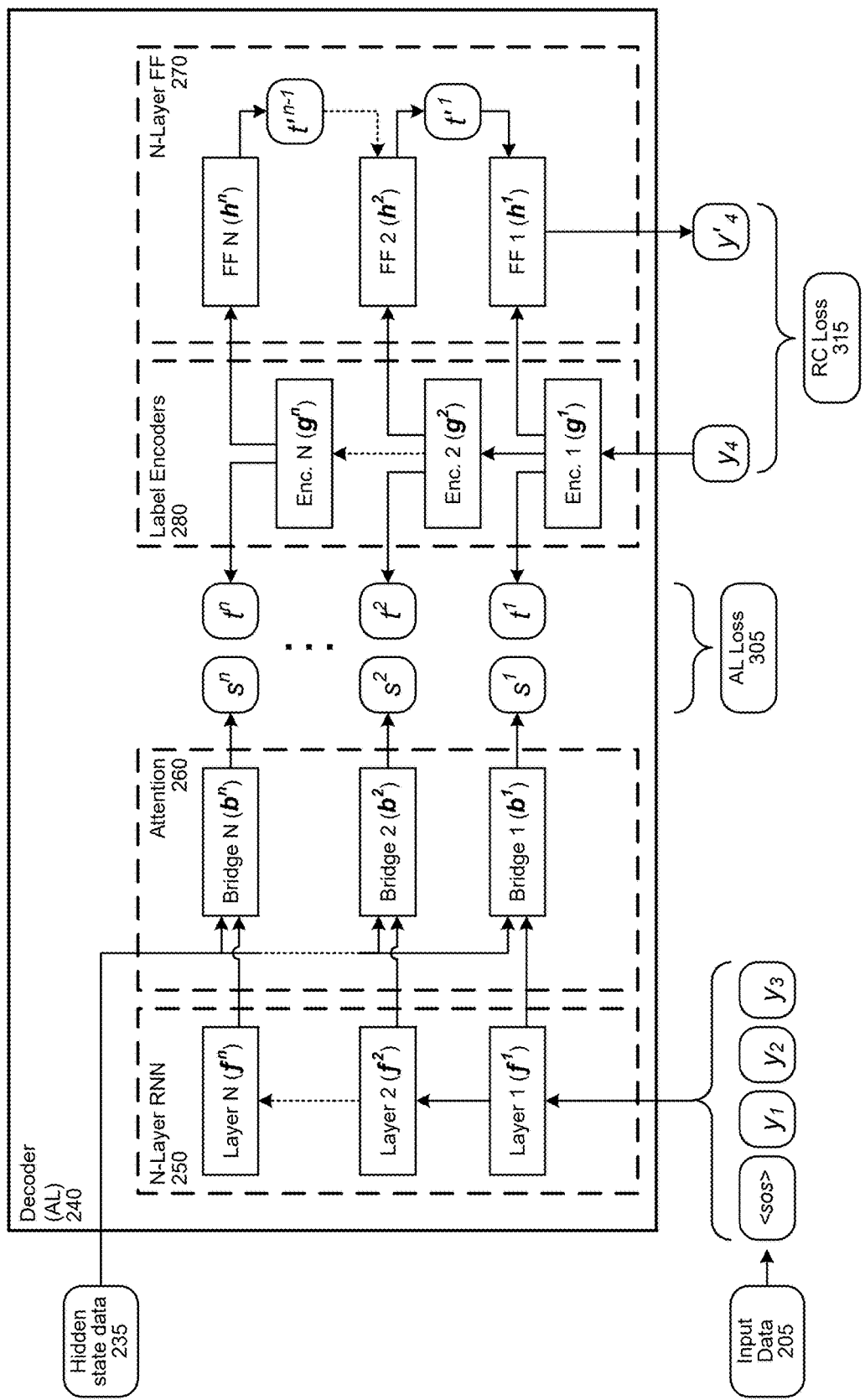
FIG. 3 is a conceptual diagram illustrating training operations of the associated learning model, according to embodiments of the present disclosure.

FIG. 3 is a conceptual diagram illustrating training operations of the associated learning model 200 in further, according to embodiments of the present disclosure. As discussed above, the model 200 is trained using a combination of associated learning loss (AL loss) 305 and reconstruction loss (RC loss) 315. The AL loss 305 may be calculated for the representation vectors $\vec{s}_j^i$ and $\vec{t}_j^i$ using, for example, a mean square error loss (MSE). The RC loss 315 may be calculated for the representation vectors $\vec{t}_j^{i-1}$ and $\vec{t}_j^i$ (e.g., as shown by the RC loss 315a in FIG. 4). For the first layer (e.g., i=1), the RC loss 315 may be calculated for the predicted token y'$_j$ using, for example, cross entropy loss (CE) (e.g., as shown by the RC loss 315b in FIG. 4).

The decoder 240 may begin predicting a $j^{th}$ target token upon receiving or generating a "start-of-sequence" token (<sos>). The decoder 240 may predict the $j^{th}$ target token by computing its $i^{th}$ layer representation vector $\vec{t}_j^i$ using the hidden state data 235 and token history $\{y_k\}_1^{j-1}$ via the $f^i$ and $b^i$ functions. The decoder 240 may also compute the $i^{th}$ layer representation vector, $\vec{t}_j^i$, using the $g^i$ functions. The $h^i$ functions may be trained to reconstruct $\vec{t}_j^{i-1}$ from $\vec{t}_j^i$. The loss function for the $i^{th}$ layer for i>1 may therefore be represented as:

$$\text{Loss}^i = \text{MSE}(\vec{s}_j^i, \vec{t}_j^i) + \text{MSE}(\vec{t}_j^{i-1}, h^i(\vec{t}_j^i)) \quad (1)$$

Where the first mean squared error (MSE) loss is the associated loss encouraging the representation vectors $\vec{t}_j^i$ and $\vec{t}_j^i$ to be as close as possible, while the second MSE loss is the reconstruction loss to ensure that $\vec{t}_j^{i-1} = h^i(g^i(\vec{t}_j^{i-1})) \approx \vec{t}_j^{i-1}$.

For the first layer (e.g., when i=1), which predicts the $j^{th}$ token $y'_j = h^1(\vec{t}_j^i)$, the loss may be computed using cross-entropy loss (CE) as the reconstruction loss as follows:

$$\text{Loss}^1 = \text{MSE}(\vec{s}_j^1, \vec{t}_j^1) + \text{CE}(y_j, h^i(\vec{t}_j^1)) \quad (2)$$

Combining equations (1) and (2), the overall loss is training can be expressed as:

$$\text{Overall Loss} = \sum_{i=1}^{N} \text{Loss}^i \quad (3)$$

Based on equations (1) and (2), the loss for the $i^{th}$ layer can be used as a local loss for $f^i$, $b^i$, $g^i$, and $h^i$ training (e.g., with no dependency from the other layers). This ability to train layers individually based on a local loss may allow better training parallelization for associated learning-form models like the model 200. In some implementations, a gradient stop may be applied between each layer of the decoder 240 during training.

Figure 4:
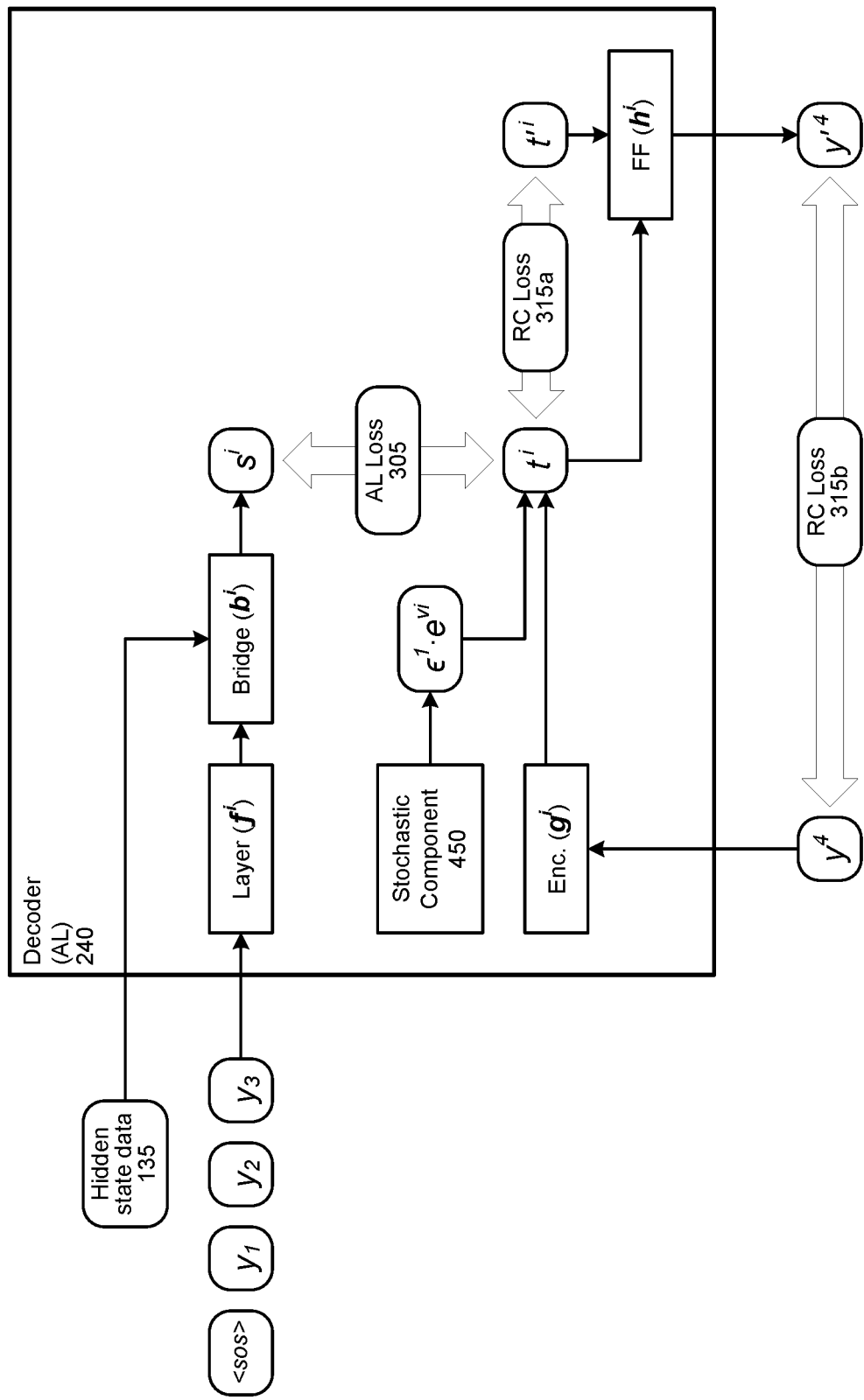
FIG. 4 is a conceptual diagram illustrating an example implementation of the associated learning model modified by adding a stochastic term to the label encoder function(s), according to embodiments of the present disclosure.

FIG. 4 is a conceptual diagram illustrating an example implementation of the associated learning model 200 modified by adding a stochastic term to the label encoder function(s), according to embodiments of the present disclosure. In some cases, the training algorithm, in an attempt to reduce losses (e.g., MSE losses calculated using Equation (1)), may tend to shrink the norm of the hidden representations (e.g., $\vec{s}_j^1$, $\vec{t}_j^1$, and $\vec{t}_j^i$) down to near zero without learning meaningful transformations. In some cases, the trained decoder 240 may only rely on previous tokens, $\{y_k\}_{k=1}^{j-1}$, for the next token prediction while ignoring the hidden state data 235.

To address these issues, the label encoders 280 may be modified with, for example, a Variational autoencoder (VAE) component that introduces a stochastic term (e.g., a random or pseudo-random noise term) into the latent representation. For example, the decoder 240 and/or the label encoder's themselves may be configured with a stochastic component 450 for adding the stochastic term such that the t representation vector becomes:

$$\vec{t}_j^1 = \vec{\mu}^i + \vec{\epsilon} \cdot e^{\vec{v}^i/2} \quad (4)$$

where $\vec{\mu}^i$ and $\vec{v}^i$ are the estimated mean and log variance vectors, respectively, and $\vec{\epsilon}$ is a noise vector sampled from a standard distribution. Additionally or alternatively, the noise vector may be added to the $\vec{t}_j^1$ representation by a component separate from the label encoder 280.

To train the decoder 240 components, a modified VAE loss term $e^{\vec{v}^i} - (1 + \vec{v}^i)$ (e.g., the Kullback-Liebler divergence (KLD) loss term without the mean part) may be added to Equations (1) and (2). The mean part of the KLD loss term may be removed to avoid the shrinking of the hidden representations described above. The noise term $\vec{\epsilon} \cdot e^{\vec{v}^i}$ in the updated $\vec{t}_j^1$ shown in Equation (4) may cause the representation vectors to stay away from zero, allowing the model 200 to learn meaningful associations between $\vec{s}_j^1$ and $\vec{t}_j^1$.

Figure 5:
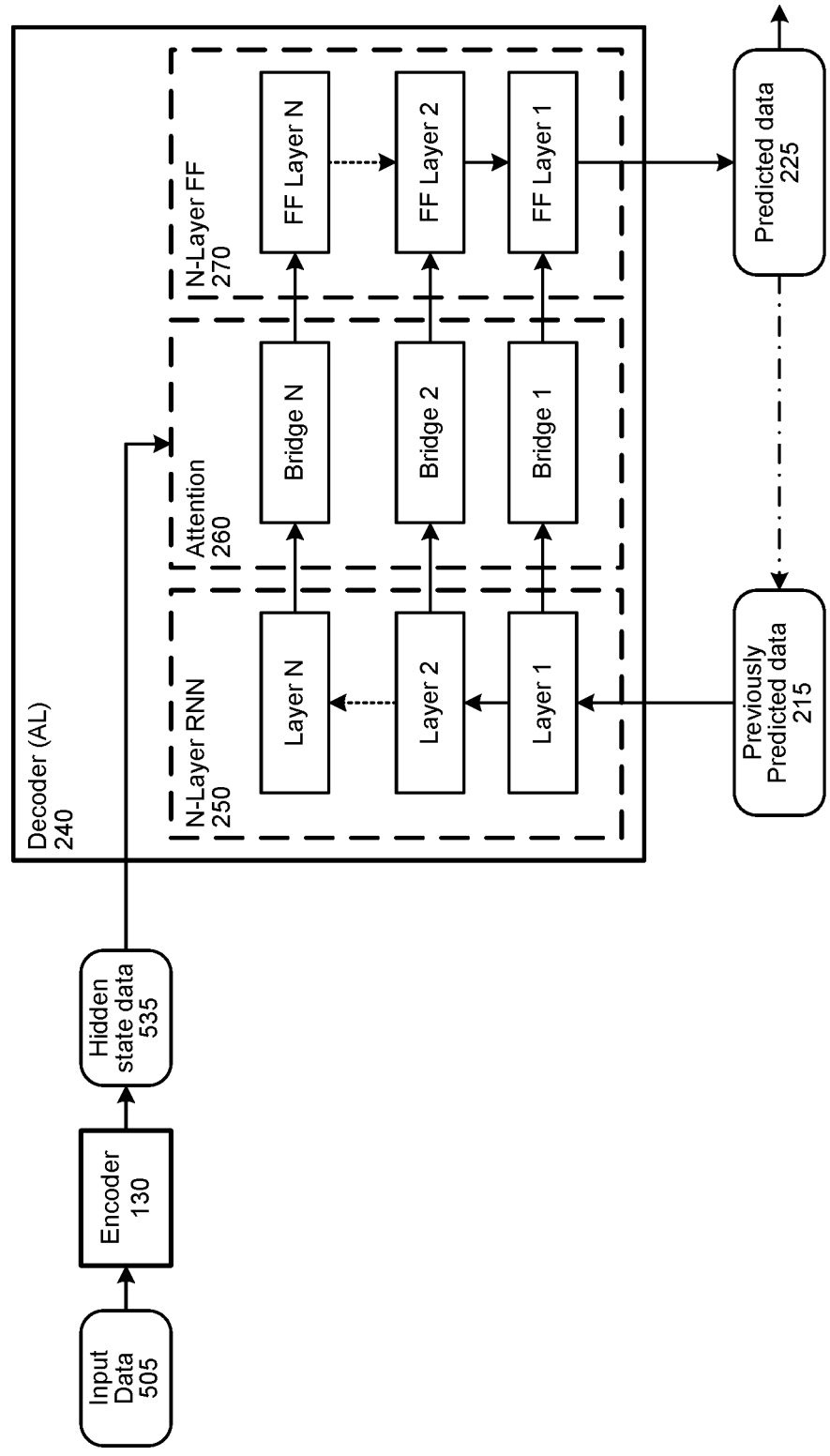
FIG. 5 is a conceptual diagram illustrating example runtime operations of the associated learning model, according to embodiments of the present disclosure.

FIG. 5 is a conceptual diagram illustrating example runtime operations of the associated learning model 500, according to embodiments of the present disclosure. The associated learning model 500 may be based on the associated learning model 200, but without the label encoders 280. The encoder 130 may receive input data 505 and generate hidden state data 535. The decoder 240 may receive the hidden state data 535 and begin predicting an output data sequence (e.g., predicted data 225) in an autoregressive manner where previously predicted data 215 becomes an input to the decoder 240 for predicting subsequent portions of the output data sequence. For example, first portion of the predicted data 225 may correspond to a first token, a second portion of the predicted data 225 may correspond to a second token that sequentially follows the first token, etc.

The label encoders 280 are not used during inference. The N-layer RNN 250, the cross-attention module 260, and the N-layer FF 270 may implement the f, b, and h functions, respectively, trained as described above with reference to FIGS. 2-4. Each layer of the N-layer RNN 250 may generate successive latent representations of the input data sequence (e.g., a "start-of-sequence" token and/or the previously predicted data 215) and pass the latent representations to the corresponding layer (e.g., bridge function) of the cross-attention module 260. Each bridge function of the cross-attention module 260 may perform a transformation of the latent representation while attending to the hidden state data 535. The cross-attention module 260 may pass the resulting latent representations (e.g., the vectors $\vec{s}_j^i$) to the N-layer FF 270. Each layer of the N-layer FF 270 may process a latent representation and, in some cases, a latent representation output by the previous FF layer (e.g., a vector $\vec{t}_j^i$) to predict the next latent representation (e.g., a vector $\vec{t}_j^{i-1}$). A final layer of the N-layer FF 270 (e.g., FF Layer 1) may output a predicted next token for the input data sequence (e.g., y'$_j$).

Figure 6:
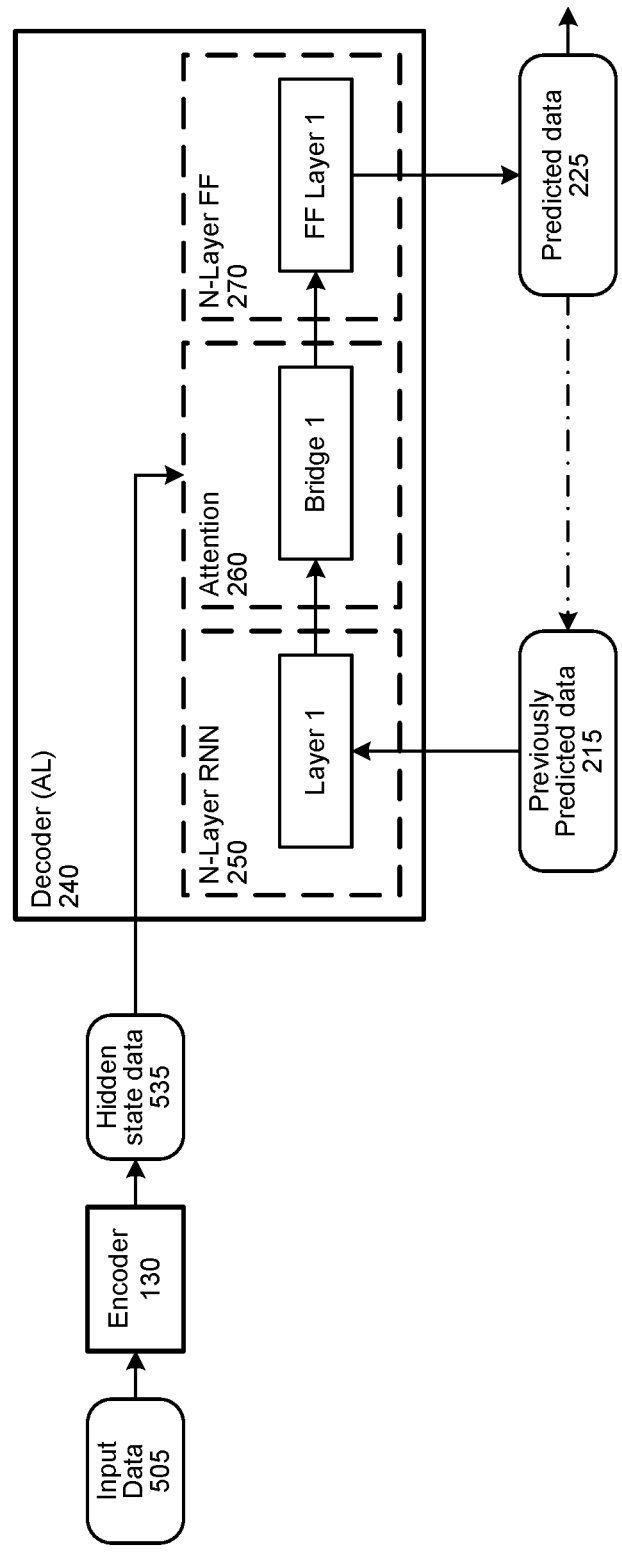
FIG. 6 is a conceptual diagram illustrating example runtime operations of the associated learning model when fewer than all trained layers are used for inference, according to embodiments of the present disclosure.
Figure 12:
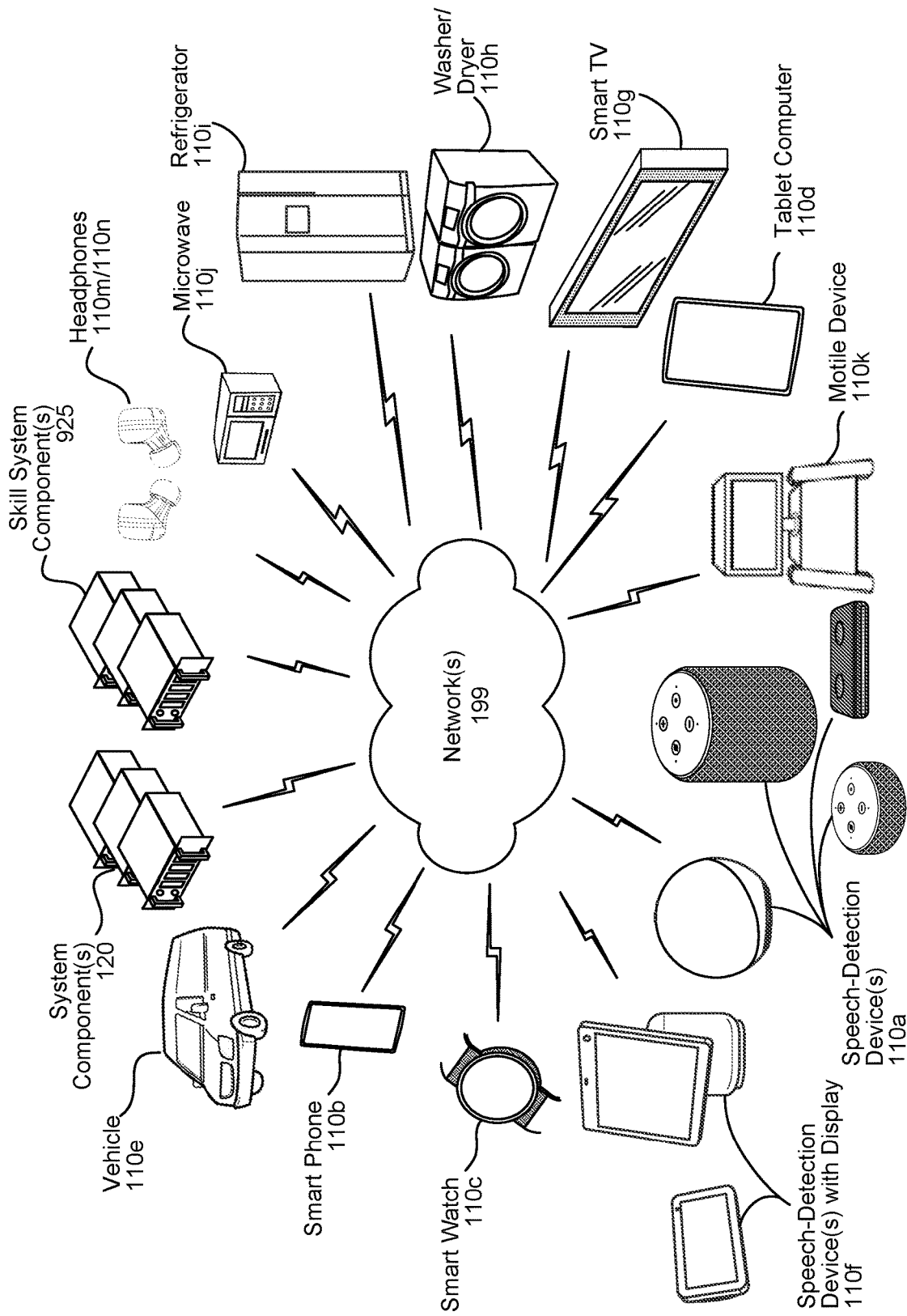
FIG. 12 illustrates an example of a computer network for use with the overall system, according to embodiments of the present disclosure.

FIG. 6 is a conceptual diagram illustrating example runtime operations of the associated learning model 600 when fewer than all trained layers are used for inference, according to embodiments of the present disclosure. The associated learning model 600 may be based on the associated learning model 200, but without the label encoders 280 and with fewer layers deployed than in the associated learning model 500. One advantage of associated learning is that inferences made with fewer than all trained layers may still yield accurate predictions. Thus, a large model 200 may be trained and, depending on the resources available for inference, a smaller model 600 made up of only a subset of the trained layers of the full model 200 may be deployed. This may be used to, for example, train a large model 200 for use in situations and on systems where computational power and memory are inexpensive and/or readily available, while a smaller model 600 may be deployed to systems and devices with limited computing resources such as mobile devices. FIG. 12, described below, shows various examples of user devices 110 and illustrates the range of available computing resources from, for example, a wearable device such as a smart watch 110c or earbuds 110m/110n constrained by size and energy source, to system components 120 which may include one or more server components of a data center.

As with the model 500 shown in FIG. 5, the model 600 shown in FIG. 6 does not include the label encoders 280, which are used for training but not for inference. The N-layer RNN 250, the cross-attention module 260, and the N-layer FF 270 may each include one layer (and/or a subset representing fewer than all of the trained layers). The N-layer RNN 250, the cross-attention module 260, and the N-layer FF 270 may, depending on the number of layers deployed, implement one or more f, b, and h functions, respectively, trained as described above with reference to FIGS. 2-4. For example, for a one-layer deployment, the model 600 would implement $f^1$, $b^1$, and $h^1$. For a two-layer deployment, the model 600 would implement $f^1$, $f^2$, $b^1$, $b^2$, $h^1$, and $h^2$, and so on.

The N-layer RNN 250 may generate a latent representation of the input data sequence (e.g., a "start-of-sequence" token and/or the previously predicted data 215) and pass the latent representation to the cross-attention module 260. The cross-attention module 260 may perform a transformation of the latent representation while attending to the hidden state data 535. The cross-attention module 260 may pass the resulting latent representation (e.g., the vectors $\vec{s}_j^i$) to the N-layer FF 270. The N-layer FF 270 may process a latent representation and may output a predicted next token for the input data sequence (e.g., $y'_j$). If more than one layer is deployed, each layer of the N-layer FF 270 for i>1 may process a latent representation output by the previous FF layer (e.g., a vector $\vec{t}_j^i$) to predict the next latent representation (e.g., a vector $\vec{t}_j^{i-1}$), while the final layer of the N-layer FF 270 (e.g., FF Layer 1) may output a predicted next token for the input data sequence (e.g., $y'_j$).

Figure 7:
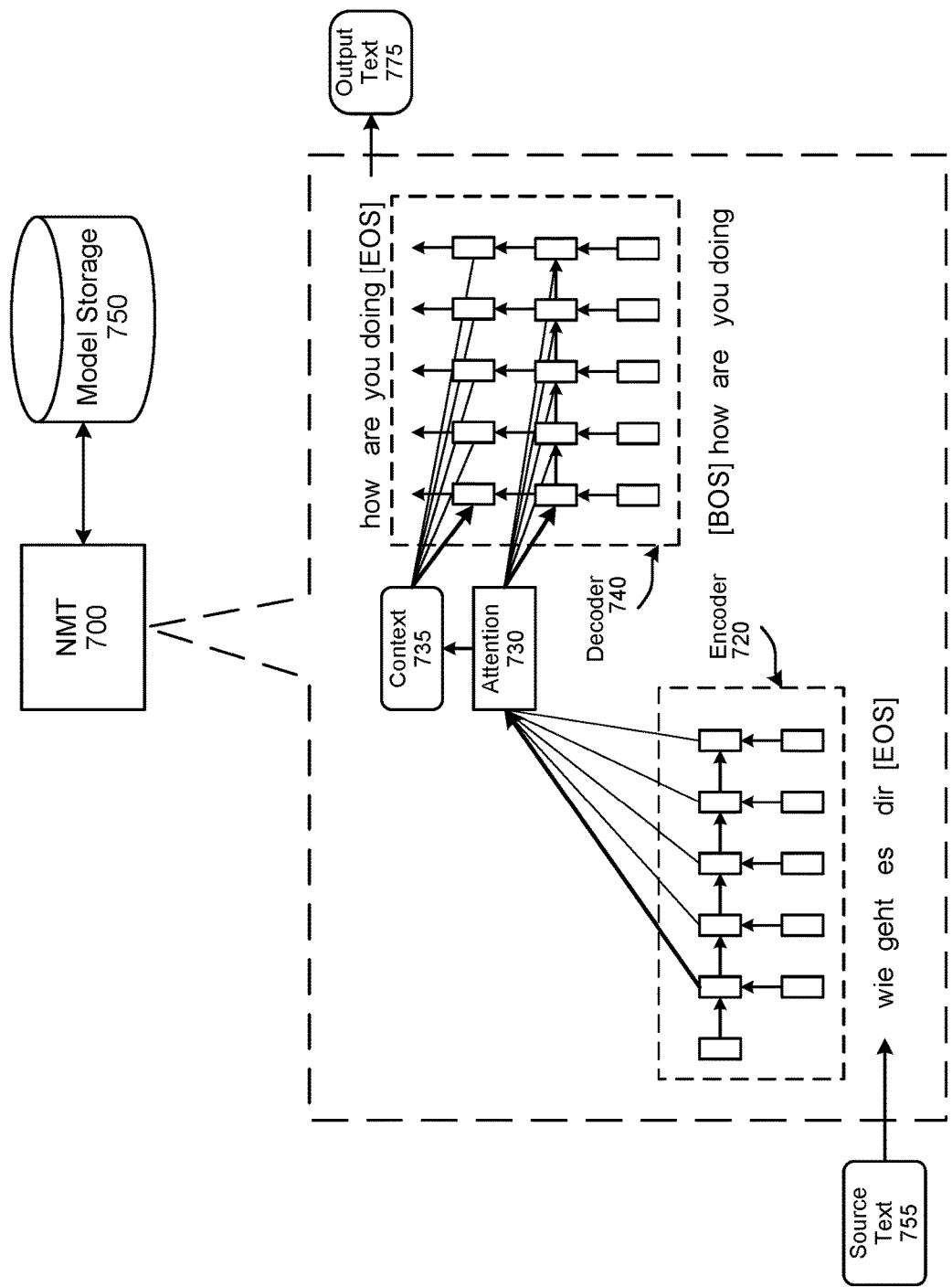
FIG. 7 is a conceptual diagram illustrating a translation component, according to embodiments of the present disclosure.

In various implementations, components of various machine learning models may be configured or reconfigured to be trained using associated learning techniques. For example, a neural machine translation (NMT) component may include a decoder that predicts an output sequence of text (e.g., in the form of characters and/or token data) in an autoregressive manner. FIG. 7 is a conceptual diagram illustrating an NMT component 700, according to embodiments of the present disclosure. The NMT component 700 may include a decoder 740 suitable for training using associated learning using the techniques described herein.

The NMT component 700 may receive source text data 755 (e.g., similar to the ASR data 815 or other text, text, token, symbol, and/or character data representing a transcript of speech) in a first language and generate output text data 775 (which may also be similar to the ASR data 815 or other text, text, token, symbol, and/or character data representing a transcript of speech) in a second language. The NMT component 700 may translate the source text data 755 in a manner that preserves semantic meaning; for example, by translating all or portions of the source text data 755 in semantic translation units, rather than performing a rote word-for-word transcription, which may ignore context and/or different meanings of words when used in different combinations. The NMT component 700 may perform the translation using an attention-based mechanism; for example, such as that found in a transformer DNN architecture.

The NMT component 700 may include an encoder 720, an attention mechanism 730, and a decoder 740. The NMT component 700 may retrieve parameters for the various networks/models from a model storage 750. The encoder 720 may read the source text until an end-of-sentence (EOS) indicator or symbol is received (although the NMT component 700 may translate the source text data 755 in a streaming fashion without waiting for an EOS to begin translating). The encoder 720 may produce a hidden representation of the sentence. The hidden representation may be, for example, vectors representing words of the source text in, for example, a sequence-to-sequence model. The encoder 720 may be a recurrent neural network (RNN), such as a long short-term memory (LSTM) network.

The decoder 740 may also be a neural network such as a recurrent neural network (RNN). The decoder 740 may produce the output text data 775 starting with a beginning-of-sentence (BOS) indicator or symbol (e.g., similar to the SOS token previously described). The decoder 740 may have access to the source text through the attention mechanism 730. The attention mechanism 730 may generate a context vector 735. The context vector 735 may be filtered for each output time step (e.g., each word). The decoder 740 may use the context vector 735 at each time step to predict the next word. Using the attention mechanism 730, the decoder 740 may decide which word(s) are most relevant for generating a target word. Thus, the attention mechanism 730 may provide the decoder 740 with information about the source text data 755 other than just a single word being translated. The attention mechanism 730 can further indicate a different importance to different words of the source text data 755 (or hidden representation) for purposes of translating a given word. In other words, the attention mechanism 730 may enable the decoder 740 to focus on the most relevant parts of a sentence represented in the source text data 755. This may aid the decoder's 740 capability to correctly translate an ambiguous word or phrase. The decoder 740 may predict subsequent words in the sequence based on the generated word and its hidden representation. The decoder 740 may continue to generate words until it predicts an EOS. The decoder 740 may then generate the output text data 775.

The decoder 740 may predict the output data sequence of the output text data 775 in an autoregressive manner where each predicted word (e.g., token, etc.) is used as an input to predict the next word. Accordingly, the NMT component 700 may be reconfigured for training using associated learning techniques as discussed herein by, for example, reconfiguring the decoder 740 similar to the decoder 240. Depending on the resources of the system or device where the NMT component 700 is to be deployed, either all or a subset of the trained layers of the decoder 740 may be deployed. Thus, a server or "cloud" implementation may process the source text data 755 using all trained layers, while a user device implementation may process the source text data 755 locally using fewer than all trained layers or even a single trained layer of the decoder 740.

One of both of the encoder 720 or the decoder 740 may include a confidence mechanism. The confidence mechanism may determine a confidence score associated an interpretation of word or phrase (in the case of the encoder 720), or the hidden representation of the word or phrase (in the case of the decoder 740). The confidence score may represent a likelihood that a word/phrase or hidden representation can be unambiguously associated with a particular meaning/translation based on the current information. If the score does not satisfy a certain condition (e.g., is below a threshold), the encoder 720/decoder 740 may continue to process words/hidden representations until the condition is satisfied (e.g., meets or exceeds a threshold). In an example operation, the encoder 720 may receive a word having multiple meanings in the source language (e.g., "run" as used in the earlier example). The encoder 720 may wait to receive additional words until it is has enough information to ascribe "run" to a particular meaning with sufficient confidence. One it has done so, it may output the hidden representation. Likewise, the decoder 740 may receive the hidden representations, which may correspond to one or more possible words in the target language. For example, a hidden representation having a meaning of a manner of locomotion faster than a walk and in which the feet never touch the ground at the same time. Such a meaning may correspond to multiple words in the target language; for example, literal translations of "run," "jog," "sprint," "dash," etc. Thus, the decoder 740 may continue to receive hidden representations of other words until it can select a translation for the chosen hidden representation of "run" with sufficient confidence, taking into account the attention data from the attention mechanism 730.

Figure 9:
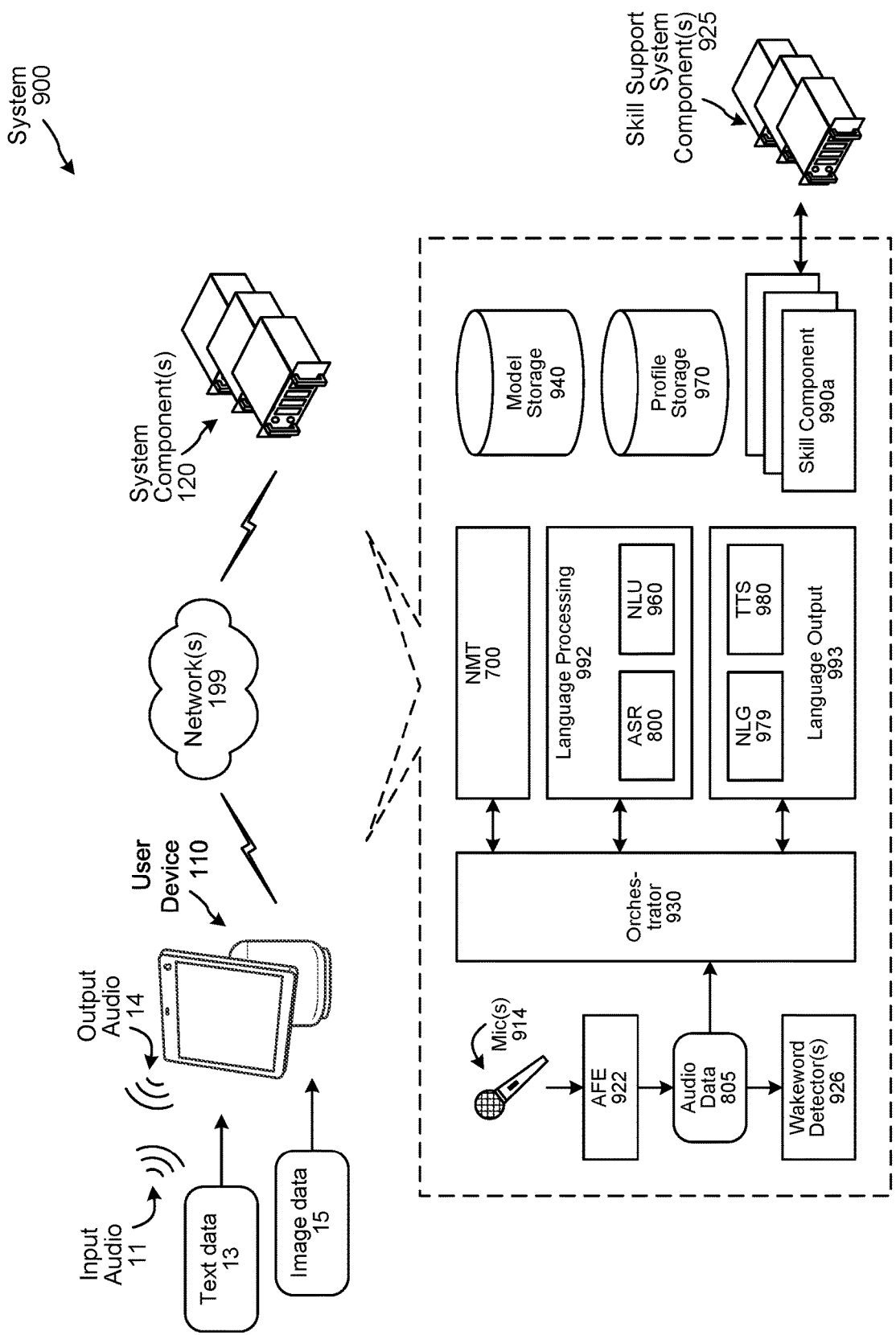
FIG. 9 is a conceptual diagram of components of a speech processing system, according to embodiments of the present disclosure.

In some implementations, the NMT component 700 may leverage natural language processing capabilities of an NLU component such as the NLU component 960 shown in FIG. 9. For example, the NMT component 700 may receive NLU output data that represents a semantic representation of the speech. For example, the NLU results data may represent semantically cohesive speech portions, for example, in the form of <noun> <verb> <subject> etc. Based on the semantic portioning provided by the NLU processing, the NMT component 700 may determine that a portion of the source text data 755 (which may correspond to ASR data 815) represents a semantically cohesive segment of speech. The NLU output data may further include intent classification and/or entity resolution data, which may provide information to the NMT component 700 regarding a meaning of a particular word or phrase in the context of the recognized speech. The encoder 720 may thus use the NLU output data to select an appropriate hidden representation of a word or phrase from among multiple possibilities.

Figure 8:
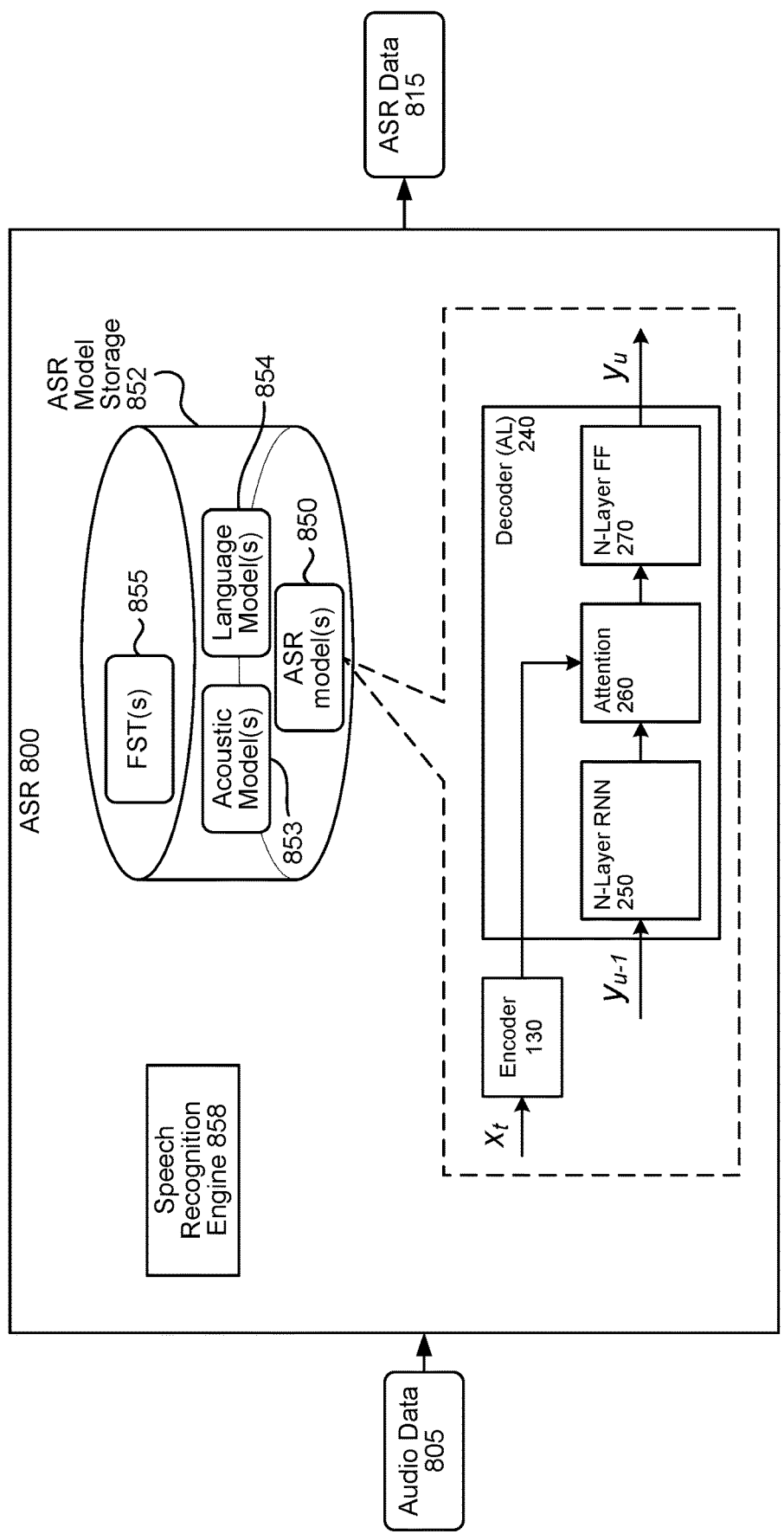
FIG. 8 is a conceptual diagram of an ASR component, according to embodiments of the present disclosure.

In various implementations, components of various machine learning models may be configured or reconfigured to be trained using associated learning techniques such as those described herein. For example, an ASR component may include various decoder that may predict a data sequence in an autoregressive manner. FIG. 8 is a conceptual diagram of an ASR component 800, according to embodiments of the present disclosure. The ASR component 800 may process the audio data 805 and generate ASR data 815 using various techniques and models. For example, the ASR component 800 may interpret a spoken natural language input based on the similarity between the spoken natural language input and one or more acoustic models 853 and language models 854 stored in an ASR model storage 852. For example, the ASR component 800 may compare the audio data with models for sounds (e.g., subword units or phonemes) and sequences of sounds to identify words that match the sequence of sounds spoken in the natural language input. Alternatively, the ASR component 800 may use a finite state transducer (FST) 855 to implement the language model functions. In some implementations, the ASR component 800 may implement one or more ASR models 850 in which neural network components work in concert to encode the input audio data 805 and predict an output data sequence of characters, text, tokens, words, etc. Various components of the ASR component 800 such as one or more of the language models 854, FSTs 855, prediction network of the ASR models 850, etc., may be reconfigured for training using associated learning techniques.

When the ASR component 800 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 800 may output an ASR hypothesis that most likely matches the spoken natural language input, or may output multiple ASR hypotheses in the form of a lattice or an N-best list, with each ASR hypothesis corresponding to a respective score.

The ASR component 800 may include a speech recognition engine 858. The ASR component 800 receives audio data 805 (for example, received from a local device 110 having processed audio detected by a microphone 914 by an acoustic front end (AFE) 922 or other component). The speech recognition engine 858 compares the audio data 805 with acoustic models 853, language models 854, FST(s) 855, and/or other data models and information for recognizing the speech conveyed in the audio data. The audio data 805 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other suitable approaches. In some cases, feature vectors of the audio data may arrive at the supporting system component(s) 120 encoded, in which case they may be decoded by the speech recognition engine 858 and/or prior to processing by the speech recognition engine 858.

In some implementations, the ASR component 800 may process the audio data 805 using one or more neural network ASR models 850a, 850b, 850c, etc., In some implementations, the ASR model(s) 850 may include the associated learning model 500 and/or the associated learning model 600 as previously described. The associated learning model may include the encoder 130 and decoder 240 as previously described. The decoder itself may include the N-layer RNN 250, attention module 260, and/or the N-layer FF 270. The associated learning model may predict a probability (y|x) of labels y=($y_1, \ldots, y_u$) (e.g., ASR data 815 in the form of text, word tokens, etc.) given acoustic features x=($x_1, \ldots, x_t$) (e.g., frames of audio data 805 in spectrogram form).

Depending on the resources of the system or device that will execute the RNN-T ASR model, either all or a subset of the trained layers of the N-layer RNN 250, attention module 260, and/or the N-layer FF 270 may be deployed. Thus, a server or "cloud" implementation may process audio data using all trained layers (e.g., as in the associated learning model 600), while a user device implementation may process audio data locally using fewer than all trained layers or even a single trained layer of each of the various components 250, 260, and 270 (e.g., as in the associated learning model 500).

In some implementations, the ASR model 850 may be a recurrent neural network such as an RNN-T. An RNN-T ASR model 850 may predict a probability (y|x) of labels y=($y_1, \ldots y_u$) given acoustic features x=($x_1, \ldots, x_t$). During inference, the RNN-T ASR model can generate an N-best list using, for example, a beam search decoding algorithm. The RNN-T ASR model may include an encoder, a prediction network, a joint network, and a softmax. The encoder may be similar or analogous to an acoustic model (e.g., similar to the acoustic model 853 described below), and may process a sequence of acoustic input features to generate encoded hidden representations. The prediction network may be similar or analogous to a language model (e.g., similar to the language model 854 described below), and may process the previous output label predictions, and map them to corresponding hidden representations. The joint network may be, for example, a feed forward neural network (NN) that may process hidden representations from both the encoder and prediction network, and predict output label probabilities. The softmax may be a function implemented (e.g., as a layer of the joint network) to normalize the predicted output probabilities.

Thus, the prediction network, joint network, and softmax may predict the output data sequence $y_1, \ldots y_u$ in an autoregressive manner. Accordingly, the RNN-T ASR model may be reconfigured for training using associated learning techniques as discussed herein by, for example, reconfiguring the prediction network similar to the N-layer RNN 250, the joint network similar to the cross-attention module 260, and the softmax similar to the N-layer FF 270.

In some implementations, the speech recognition engine 858 may process the audio data 805 with reference to information stored in the ASR model storage 852. Feature vectors of the audio data 805 may arrive at the system component(s) encoded, in which case they may be decoded prior to processing by the speech recognition engine 858.

The speech recognition engine 858 attempts to match received feature vectors to language acoustic units (e.g., phonemes) and words as known in the stored acoustic models 853, language models 854, and FST(s) 855. For example, audio data 805 may be processed by one or more acoustic model(s) 853 to determine acoustic unit data. The acoustic unit data may include indicators of acoustic units detected in the audio data 805 by the ASR component 800. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR data 815. In some implementations, the language model 854 and/or the FST 855 may predict an output data sequence in an autoregressive manner (e.g., where a predicted output token or label is used to predict the next output token or label). The ASR data 815 can include one or more hypotheses, each corresponding to a predicted output data sequence. One or more of the hypotheses represented in the ASR data 815 may then be sent to further components (such as the NLU component 960) for further processing as discussed herein. The ASR data 815 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 800 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 800 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 800 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In some implementations, ASR, NLU, NMT, NLG, and/or TTS may be used together as part of a speech-processing/virtual assistant system 900 that can communicate with a user by processing spoken inputs and responding with synthesized speech. A speech-processing system 900 may additionally receive other inputs and provide other outputs. For example, the system 900 may perform actions for and/or on behalf of the user such as providing a voice user interface (VUI) for various functions performed by components of the system 900 as described further below. Certain speech processing functions such as ASR and NMT may be performed using machine learning models that may operate to predict sequences of data (e.g., a transcript of speech in the case of ASR and a translation of speech or written language in the case of NMT). Various models employed by these and other data processing components may be reconfigured for training using associated learning techniques as described herein. Models trained using associated learning may be particularly beneficial to the system 900, which may share and/or divide certain operations between a user device 110 and one or more system components 120 and/or 925. For example, training by associated learning may be used to generate models that may be flexibly adapted to the computing resources available. A large, complex model may be trained to operate on, for example, a system component 120 and/or 925, while a lightweight deployment of the same model consisting of fewer than all trained layers may be deployed to a user device 110. The various models of the system 900, whether configured for training by associated learning or otherwise, may be stored in a model storage 940. In some implementations, the model storage 940 may store different associated learning models for performing different types of processing; for example, ASR, NMT, NLU (and/or separately performing named entity recognition, intent classification, and/or entity resolution), etc. In some implementations, the model storage 940 may store different versions of associated learning models that may be deployed selectively based on the computing resources available on the receiving device.

The system 900 may operate using various components as described in FIG. 9. The various components may be located on same or different physical devices. Communication between various components may occur directly or across a network(s) 199. The user device 110 may include audio capture component(s), such as a microphone 914 or array of microphones 914 that capture the audio 11. An acoustic front end (AFE) 922 of the user device 110 may receive the audio signal from the microphone(s) 914 and generate corresponding audio data 805. Once speech is detected in audio data 805 representing the audio 11, the device 110 may determine if the speech is directed at the device 110/system component(s). In at least some embodiments, such determination may be made using a wakeword detection component 926. The wakeword detection component 926 may be configured to detect various wakewords. In at least some examples, each wakeword may correspond to a name of a different digital assistant. An example wakeword/digital assistant name is "Alexa." In another example, input to the system may be in form of text data 13, for example as a result of a user typing an input into a user interface of device 110. Other input forms may include indication that the user has pressed a physical or virtual button on device 110, the user has made a gesture, etc. In some implementations, the device 110 may also capture images using camera(s) of the device 110 (e.g., a camera 1018) and may send image data representing those image(s) to various component of the system for processing. The image data may include raw image data or image data processed by the device 110 before sending to the system component(s). The image data may be used in various manners by different components of the system to perform operations such as determining whether a user is directing an utterance to the system, interpreting a user command, responding to a user command, etc.

The wakeword detection component 926 of the device 110 may process the audio data 805, representing the audio 11, to determine whether speech is represented therein. The device 110 may use various techniques to determine whether the audio data 805 includes speech. In some examples, the device 110 may apply voice-activity detection (VAD) techniques. Such techniques may determine whether speech is present in audio data 805 based on various quantitative aspects of the audio data 805, such as the spectral slope between one or more frames of the audio data 805; the energy levels of the audio data 805 in one or more spectral bands; the signal-to-noise ratios of the audio data 805 in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data 805 to one or more acoustic models in storage, which acoustic models may include models corresponding to speech, noise (e.g., environmental noise or background noise), or silence. Still other techniques may be used to determine whether speech is present in audio data 805.

Wakeword detection is can be performed without performing linguistic analysis, textual analysis, or semantic analysis. Instead, the audio data 805, representing the audio 11, is analyzed to determine if specific characteristics of the audio data 805 match preconfigured acoustic waveforms, audio signatures, or other data corresponding to a wakeword.

Thus, the wakeword detection component 926 may compare audio data 805 to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 926 may be built on deep neural network (DNN)/recursive neural network (RNN) structures directly, without HMM being involved. Such an architecture may estimate the posteriors of wakewords with context data, either by stacking frames within a context window for DNN, or using RNN. Followon posterior threshold tuning or smoothing is applied for decision making. Other techniques for wakeword detection may also be used.

Once the wakeword is detected by the wakeword detection component 926 and/or input is detected by an input detector, the device 110 may "wake" and begin processing the audio data 805 and/or transmitting the audio data 805 for processing by one or more system component(s) 120. The audio data 805 may include data corresponding to the wakeword; in other embodiments, the portion of the audio corresponding to the wakeword is removed by the device 110 prior to processing or transmitting the audio data 805. In the case of touch input detection or gesture-based input detection, the audio data may not include a wakeword.

In some implementations, the system 900 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 926 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 990a, 990b, 990c, etc. (collectively "skill components 990") of one or more system component(s) 120.

The audio data 805 may be sent to an orchestrator component 930. The orchestrator component 930 may include memory and logic that enables the orchestrator component 930 to transmit various pieces and forms of data to various components of the system, as well as perform other operations as described herein.

The orchestrator component 930 may send the audio data 805 to one or more language processing components 992. The language processing components 992 (sometimes also referred to as spoken language understanding (SLU) components) may include an ASR component 800 (e.g., as shown in FIG. 8) and a natural language understanding (NLU) component 960. The ASR component 800 may transcribe the audio data 805 into text data (e.g., ASR data 815). The text data output by the ASR component 800 represents one or more than one (e.g., in the form of an N-best list) ASR hypotheses representing speech represented in the audio data 805. The ASR component 800 interprets the speech in the audio data 805 based on a similarity between the audio data 805 and pre-established language models. For example, the ASR component 800 may compare the audio data 805 with models for sounds (e.g., acoustic units such as phonemes, senons, phones, etc.) and sequences of sounds to identify words that match the sequence of sounds of the speech represented in the audio data 805. The ASR component 800 sends the text data generated thereby to an NLU component 960, via, in some embodiments, the orchestrator component 930. The text data sent from the ASR component 800 to the NLU component 960 may include a single top-scoring ASR hypothesis or may include an N-best list including multiple top-scoring ASR hypotheses. An N-best list may additionally include a respective score associated with each ASR hypothesis represented therein.

The NLU component 960 may receive the ASR data 815 from the ASR component 800 and attempt to semantically interpret the phrase(s) or statement(s) represented in the ASR data 815 input therein by determining one or more meanings associated with the phrase(s) or statement(s) represented in the text data. The NLU component 960 may determine an intent representing an action that a user desires be performed and may determine information that allows a device (e.g., the device 110, the system component(s) 120, a skill component 990, a skill system support component(s) 925, etc.) to execute the intent. For example, if the text data corresponds to "play the $5^{th}$ Symphony by Beethoven," the NLU component 960 may determine an intent that the system output music and may identify "Beethoven" as an artist/composer and "5th Symphony" as the piece of music to be played. For further example, if the text data corresponds to "what is the weather," the NLU component 960 may determine an intent that the system output weather information associated with a geographic location of the device 110. In another example, if the text data corresponds to "turn off the lights," the NLU component 960 may determine an intent that the system turn off lights associated with the device 110 or the user 5. However, if the NLU component 960 is unable to resolve the entity—for example, because the entity is referred to by anaphora such as "this song" or "my next appointment"—the language processing components 992 can send a decode request to other language processing components for information regarding the entity mention and/or other context related to the utterance. The other language processing components 992 may augment, correct, or base results data upon the audio data 805 as well as any data received from the other language processing components.

The NLU component 960 may return NLU results data (which may include tagged text data, indicators of intent, etc.) back to the orchestrator component 930. The orchestrator component 930 may forward the NLU results data to a skill component(s) 990. If the NLU results data includes a single NLU hypothesis, the NLU component 960 and the orchestrator component 930 may direct the NLU results data to the skill component(s) 990 associated with the NLU hypothesis. If the NLU results data includes an N-best list of NLU hypotheses, the NLU component 960 and the orchestrator component 930 may direct the top scoring NLU hypothesis to a skill component(s) 990 associated with the top scoring NLU hypothesis.

A skill component may be software running on the system component(s) 120 that is akin to a software application. That is, a skill component 990 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 990. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 990 may operate in conjunction between the system component(s) 120 and other devices, such as the device 110, in order to complete certain functions. Inputs to a skill component 990 may come from speech processing interactions or through other interactions or input sources. A skill component 990 may include hardware, software, firmware, or the like that may be dedicated to a particular skill component 990 or shared among different skill components 990.

A skill system support component(s) 925 may communicate with a skill component(s) 990 within the system component(s) 120 and/or directly with the orchestrator component 930 or with other components. A skill system support component(s) 925 may be configured to perform one or more actions. An ability to perform such action(s) may sometimes be referred to as a "skill." That is, a skill may enable a skill system support component(s) 925 to execute specific functionality in order to provide data or perform some other action requested by a user. For example, a weather service skill may enable a skill system support component(s) 925 to provide weather information to the system component(s) 120, a car service skill may enable a skill system support component(s) 925 to book a trip with respect to a taxi or ride sharing service, an order pizza skill may enable a skill system support component(s) 925 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 990 dedicated to interacting with the skill system support component(s) 925. Unless expressly stated otherwise, reference to a skill, skill device, or skill component may include a skill component 990 operated by the system component(s) 120 and/or skill operated by the skill system support component(s) 925. Moreover, the functionality described herein as a skill or skill may be referred to using many different terms, such as an action, bot, app, or the like. The skill component 990 and or skill system support component(s) 925 may return output data to the orchestrator component 930.

In some implementations, the system 900 may include the NMT component 700 as previously described. The NMT component 700 may perform operations related to translating a natural language input in a first language into natural language output in a second language. The NMT component 700 may receive input segments (e.g., text data, which may include formatting and/or markup tags such as is used in HTML) and return a translated segment (e.g., translated text data). In some implementations, the NMT component 700 may be implemented as a skill component 990, as one of the language processing components 992, or as an independent component. The NMT component 700 may translate natural language received from the user (e.g., requests and/or commands) and/or data to be output to the user (e.g., translating text or speech for the user).

The NMT component 700 may receive source text data 755 (which may in some cases include ASR data 815). In some implementations, the NMT component 700 may additionally receive NLU results data, which may add semantic meaning to words and/or phrases in the source text data 755. The NMT component 700 may translate the source text data 755 from the source language to a target language. In some implementations, the source text data 755 may be received from the ASR component 800, but in certain instances the source text data 755 may be received from another source, such as in the case of a video that is accompanied by metadata that includes a transcript of the speech (e.g., closed captions and/or subtitles), text in a foreign language website, an email or message to be translated, etc. The NMT component 700 may include one or more machine learning models for translating the transcription in a manner that preserves semantic meaning. For example, the NMT component 700 may employ a deep neural network (DNN) having an attention mechanism that can take into account the context of a word and/or phrase such that the resulting translation represents the meaning and/or use of the word in context of a semantically cohesive speech segment in which it appears, rather than simply providing the closest literal translation of the word/phrase. Depending on the particular word, phrase, clause, etc., the semantically cohesive segment may include a portion of a sentence, a whole sentence, or more speech than a single sentence.

The system component(s) includes language output components 993. The language output components 993 includes a natural language generation (NLG) component 979 and a text-to-speech (TTS) component 980. The NLG component 979 can generate text for purposes of TTS output to a user.

For example, the NLG component 979 may generate text corresponding to instructions corresponding to a particular action for the user to perform. The NLG component 979 may generate appropriate text for various outputs as described herein. The NLG component 979 may include one or more trained models configured to output text appropriate for a particular input. The text output by the NLG component 979 may become input for the TTS component 980. Alternatively or in addition, the TTS component 980 may receive text data from a skill component 990 or other system component for output.

The NLG component 979 may include a trained model. The NLG component 979 may generate text data based on, for example, dialog data received from a dialog manager such that the output text data has a natural feel and, in some embodiments, includes words and/or phrases specifically formatted for a requesting individual. The NLG component 979 may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG component 979 may analyze a transcription of a regional sports program to determine commonly used words or phrases for describing scores or other sporting news for a particular region. The NLG component 979 may further receive, as inputs, a dialog history, an indicator of a level of formality, and/or a command history or other user history such as the dialog history. In some implementations, text data generated by the NLG component 979 may be used as source text data 755 for the NMT component 700, with the output text data 775 of the NMT component 700 converted to speech by the TTS component 980.

The NLG component 979 may generate dialog data based on one or more response templates. Further continuing the example above, the NLG component 979 may select a template in response to the question, "What is the weather currently like?" of the form: "The weather currently is $weather_information$." The NLG component 979 may analyze the logical form of the template to produce one or more textual responses including markups and annotations to familiarize the response that is generated. In some embodiments, the NLG component 979 may determine which response is the most appropriate response to be selected. The selection may, therefore, be based on past responses, past questions, a level of formality, and/or any other feature, or any other combination thereof. Responsive audio data representing the response generated by the NLG component 979 may then be generated using the text-to-speech component 980.

The TTS component 980 may generate audio data (e.g., synthesized speech) from text data using one or more different methods. Text data input to the TTS component 980 may come from a skill component 990, the orchestrator component 930, or another component of the system. In one method of synthesis called unit selection, the TTS component 980 matches text data against a database of recorded speech. The TTS component 980 selects matching units of recorded speech and concatenates the units together to form audio data. In another method of synthesis called parametric synthesis, the TTS component 980 varies parameters such as frequency, volume, and noise to create audio data including an artificial speech waveform. Parametric synthesis uses a computerized voice generator, sometimes called a vocoder.

The system 900 (either on device 110, system component(s) 120, or a combination thereof) may include profile storage 970 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 10:
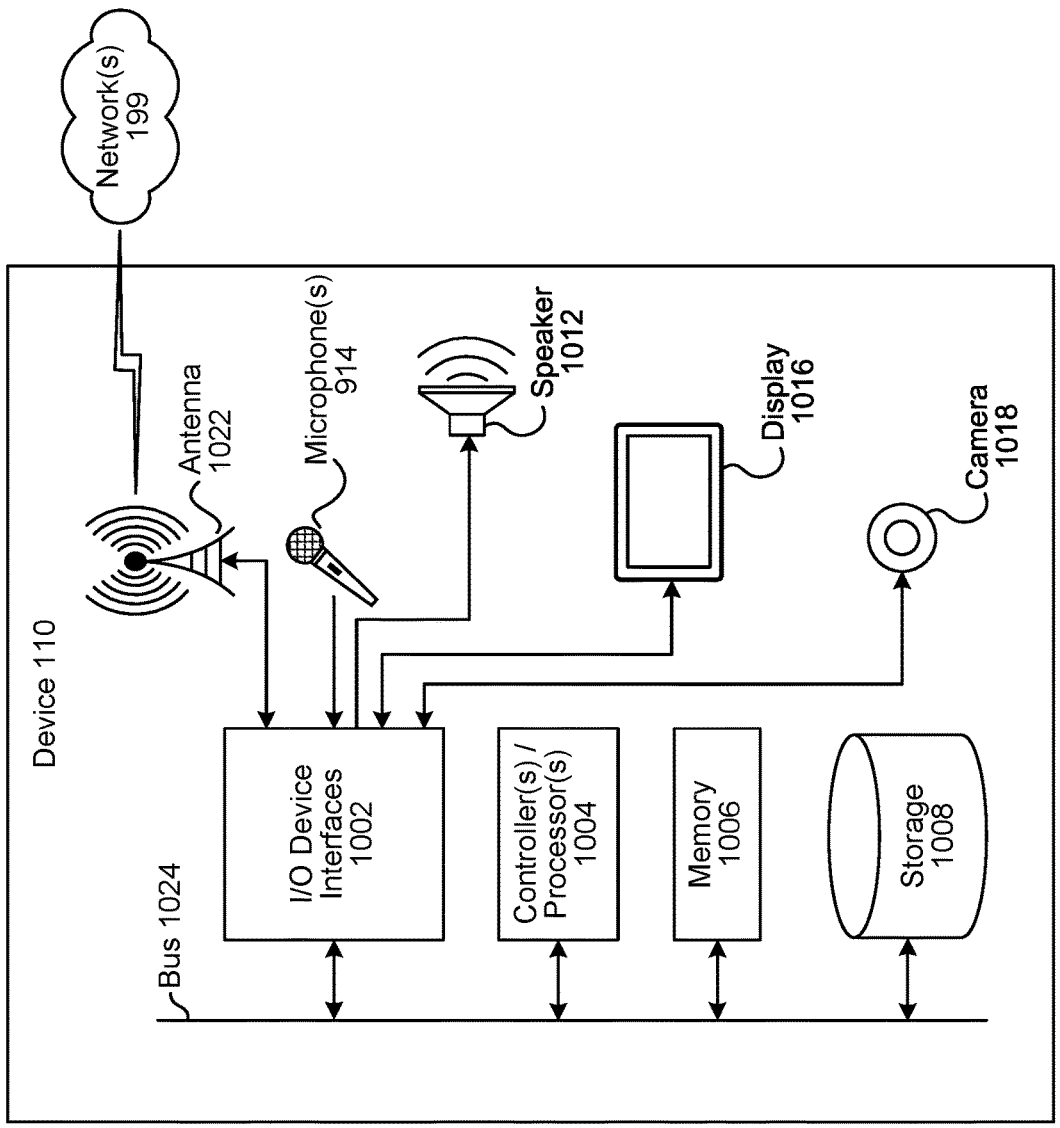
FIG. 10 is a block diagram conceptually illustrating example components of a device, according to embodiments of the present disclosure.
Figure 11:
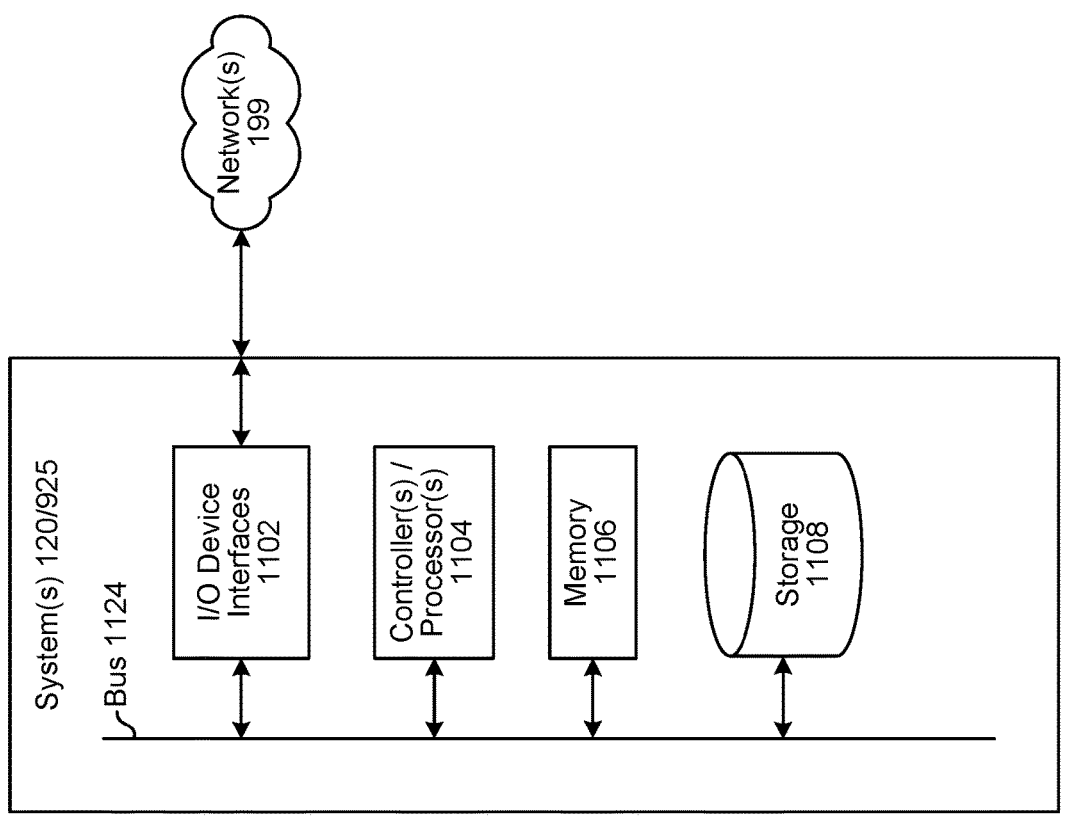
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of a remote device, such as the natural language command processing system component(s), which may assist with ASR processing, NLU processing, etc., and a skill system support component(s) 925. A system (120/925) may include one or more servers. A "server" as used herein may refer to a server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/925) may be included in the overall system 900 of the present disclosure, such as one or more natural language processing system component(s) 120 for performing ASR processing, one or more natural language processing system component(s) 120 for performing NLU processing, one or more skill system support component(s) 925, etc. In operation, each of these systems may include computer-readable and computer-executable instructions that reside on the respective device (120/925), as will be discussed further below.

Each of these devices (110/120/925) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/925) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/925) may also be connected to removable or external non-volatile memory and/or storage (such as a removable memory card, memory key drive, networked storage, etc.) through respective input/output device interfaces (1002/1102).

Computer instructions for operating each device (110/120/925) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/925) includes input/output device interfaces (1002/1102). A variety of components may be connected through the input/output device interfaces (1002/1102), as will be discussed further below. Additionally, each device (110/120/925) may include an address/data bus (1024/1124) for conveying data among components of the respective device. Each component within a device (110/120/925) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 914 or array of microphones 914, a wired headset or a wireless headset (not illustrated), etc. If an array of microphones 914 is included, approximate distance to a sound's point of origin may be determined by acoustic localization based on time and amplitude differences between sounds captured by different microphones 914 of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system component(s), or a skill system support component(s) 925 may include their own dedicated processors, memory, and/or storage. Alternatively, one or more of the components of the device(s) 110, the natural language command processing system component(s), or a skill system support component(s) 925 may utilize the I/O interfaces (1002/1102), processor(s) (1004/1104), memory (1006/1106), and/or storage (1008/1108) of the device(s) 110, natural language command processing system component(s), or the skill system support component(s) 925, respectively. Thus, the ASR component 800 may have its own I/O interface(s), processor(s), memory, and/or storage; the NLU component 960 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, system component(s) 120, and/or skill system support component(s) 925, as described herein, are illustrative, and may be located as a stand-alone device or may be included, in whole or in part, as a component of a larger device or system.

As illustrated in FIG. 12, multiple user devices (110*a*-110*n*, 120, 925) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system support component(s) 925, and/or others. The support devices may connect to the network(s) 199 through a wired connection or wireless connection. Networked devices may capture audio using one-or-more built-in or connected microphones 914 or other audio capture devices, with processing performed by ASR components, NLU components, or other components of the same device or another device connected via the network(s) 199, such as the ASR component 800, the NLU component 960, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for training a machine learning model, the method comprising:
   receiving first input data representing a first sequence of tokens from a training dataset;
   processing the first input data using a first plurality of components corresponding to a first layer of a first machine learning model to determine a first latent representation of a first portion of the first input data and a second latent representation of a second portion of the first input data, the second portion following the first portion in the first sequence;
   determining, using a second plurality of components corresponding to a second layer of the first machine learning model, a third latent representation of the first latent representation and a fourth latent representation of the second latent representation;
   processing the fourth latent representation using a first neural network component of the second plurality of components to determine a predicted second latent representation;
   processing the second latent representation and the predicted second latent representation using a second neural network component of the first plurality of components to determine a predicted second portion of the first input data;
   configuring a third plurality of components for a second machine learning model using:
      a first associated learning loss determined using the first latent representation and the second latent representation, and a first reconstruction loss determined using the second portion and the predicted second portion; and configuring a fourth plurality of components for the second machine learning model using:

a second associated learning loss determined using the third latent representation and the fourth latent representation, and a second reconstruction loss determined using the second latent representation and the predicted second latent representation, wherein the second machine learning model represents an update of the first machine learning model.

2. The computer-implemented method of claim 1, further comprising:

receiving second input data representing a second sequence of frames of audio data including speech;

processing the second input data using an encoder component to generate first data representing a hidden state representation of the second input data; and processing the first data using the third plurality of components and the fourth plurality of components to generate first output data representing a transcript of the speech.

3. The computer-implemented method of claim 1, further comprising:

determining a third machine learning model that includes the third plurality of components but not the fourth plurality of components;

sending, to a device, first data representing the third machine learning model; and causing the device to process second input data representing a second sequence of frames of audio data including speech using the third machine learning model to generate first output data representing a transcript of the speech.

4. The computer-implemented method of claim 3, further comprising:

determining, using a third component of the first plurality of components, a first stochastic term; and determining, using a fourth component of the second plurality of components, a second stochastic term, wherein:

the second latent representation includes the first stochastic term, and the fourth latent representation includes the second stochastic term.

5. A computer-implemented method comprising:

receiving first input data representing speech;

processing the first input data using an encoder component to generate first encoded data representing a hidden state representation of the first input data;

processing, using first plurality of components of a first machine learning model, the first encoded data and a first portion of first output data to predict a second portion of the first output data, the first output data representing a transcript of the speech, wherein:

the first plurality of components are trained according to a first loss calculated using first data representing a latent representation of a first portion of training data and second data representing a latent representation of a second portion of the training data following the first portion, and the first machine learning model includes a second plurality of components trained according to a second loss calculated using second third data representing a latent representation of the first data and fourth data representing a latent representation of the second data; and sending the first output data to a first system component.

6. The computer-implemented method of claim 5, further comprising:

receiving, by the first system component, the first output data; and performing, by the first system component, natural language understanding (NLU) processing to determine semantic content of the speech.

7. The computer-implemented method of claim 5, wherein the first input data represents a first natural language, and the first output data represents a second natural language, the method further comprising:

receiving, by the first system component, the first output data;

performing, by the first system component, text-to-speech processing to generate synthesized speech in the second natural language; and causing a device to output the synthesized speech.

8. The computer-implemented method of claim 5, further comprising, prior to receiving the first input data:

processing, using a third plurality of components corresponding to a second machine learning model, the training data to determine the first data and the second data;

determining the first loss using the first data and the second data; and determining the first plurality of components for the first machine learning model using the first loss, the first machine learning model representing an update of the second machine learning model.

9. The computer-implemented method of claim 8, further comprising:

determining, using a fourth plurality of components corresponding to the second machine learning model, the third data and the fourth data;

determining the second loss using the second data and the fourth data; and determining the second plurality of components for the first machine learning model using the second loss.

10. The computer-implemented method of claim 8, further comprising:

determining, using the third plurality of components, a stochastic term, wherein the first data is additionally determined using the stochastic term.

11. The computer-implemented method of claim 5, further comprising, prior to receiving the first input data:

processing the second data using a first component of a second machine learning model to determine a predicted second portion of the training data;

determining a first reconstruction loss using the predicted second portion of the training data and the second portion of the training data; and determining the first plurality of components using the first reconstruction loss, the first machine learning model representing an update of the second machine learning model.

12. The computer-implemented method of claim 11, further comprising:

processing the fourth data using a second component of the second machine learning model to determine fifth data representing a latent representation of the fourth data, wherein determining the predicted second portion of the training data additionally includes processing the fifth data using the first component of the second machine learning model.

13. A system, comprising:
at least one processor; and
at least one memory comprising instructions that, when executed by the at least one processor, cause the system to:
receive first input data representing speech;
process the first input data using an encoder component to generate first encoded data representing a hidden state representation of the first input data;
process, using first plurality of components of a first machine learning model, the first encoded data and a first portion of first output data to predict a second portion of the first output data, the first output data representing a transcript of the speech, wherein:
the first plurality of components are trained according to a first loss calculated using first data representing a latent representation of a first portion of training data and second data representing a latent representation of a second portion of the training data following the first portion, and
the first machine learning model includes a second plurality of components trained according to a second loss calculated using third data representing a latent representation of the first data and fourth data representing a latent representation of the second data; and
send the first output data to a first system component.

14. The system of claim 13, wherein the at least one memory further comprises instructions that, when executed by the at least one processor, further cause the system to:
receive, by the first system component, the first output data; and
perform, by the first system component, natural language understanding (NLU) processing to determine semantic content of the speech.

15. The system of claim 13, wherein the first input data represents a first natural language, the first output data represents a second natural language, and the at least one memory further comprises instructions that, when executed by the at least one processor, further cause the system to:
receive, by the first system component, the first output data;
perform, by the first system component, text-to-speech processing to generate synthesized speech in the second natural language; and
cause a device to output the synthesized speech.

16. The system of claim 13, wherein the at least one memory further comprises instructions that, when executed by the at least one processor, further cause the system to:
process, using a third plurality of components corresponding to a second machine learning model, the training data to determine the first data and the second data;
determine the first loss using the first data and the second data; and
determine the first plurality of components for the first machine learning model using the first loss, the first machine learning model representing an update of the second machine learning model.

17. The system of claim 16, wherein the at least one memory further comprises instructions that, when executed by the at least one processor, further cause the system to:
determine, using a fourth plurality of components corresponding to the second machine learning model, the third data and the fourth data;
determine the second loss using the second data and the fourth data; and
determine the second plurality of components for the first machine learning model using the second loss.

18. The system of claim 16, wherein the at least one memory further comprises instructions that, when executed by the at least one processor, further cause the system to:
determining, using the third plurality of components, a stochastic term, wherein the first data is additionally determined using the stochastic term.

19. The system of claim 13, wherein the at least one memory further comprises instructions that, when executed by the at least one processor, further cause the system to, prior to receiving the first input data:
process the second data using a first component of a second machine learning model to determine a predicted second portion of the training data;
determine a first reconstruction loss using the predicted second portion of the training data and the second portion of the training data; and
determine the first plurality of components using the first reconstruction loss, the first machine learning model representing an update of the second machine learning model.

20. The system of claim 19, wherein the at least one memory further comprises instructions that, when executed by the at least one processor, further cause the system to:
process the fourth data using a second component of the second machine learning model to determine fifth data representing a latent representation of the fourth data, wherein determining the predicted second portion of the training data additionally includes processing the fifth data using the first component of the second machine learning model.

* * * * *